(12) United States Patent (10) Patent No.: US 9,390,006 B2
Onodera et al. (45) Date of Patent: Jul. 12, 2016

(54) GARBAGE COLLECTION OF AN OBJECT

(75) Inventors: Tamiya Onodera, Tokyo (JP); Kiyokuni Kawachiya, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 385 days.

(21) Appl. No.: 13/568,646

(22) Filed: Aug. 7, 2012

(65) Prior Publication Data

US 2014/0040327 A1 Feb. 6, 2014

Related U.S. Application Data

(63) Continuation of application No. 13/563,221, filed on Jul. 31, 2012, now abandoned.

(51) Int. Cl.
*G06F 12/00* (2006.01)
*G06F 17/30* (2006.01)
*G06F 12/02* (2006.01)
*G06F 9/445* (2006.01)
*G06F 9/44* (2006.01)

(52) U.S. Cl.
CPC .......... *G06F 12/0261* (2013.01); *G06F 9/4428* (2013.01); *G06F 9/44521* (2013.01); *G06F 2212/1004* (2013.01); *G06F 2212/1056* (2013.01); *G06F 2212/152* (2013.01)

(58) Field of Classification Search
CPC ............ G06F 12/0253; G06F 12/0261; G06F 12/0269; G06F 9/526; G06F 11/3409
USPC .......................................... 707/814; 717/162
See application file for complete search history.

(56) References Cited

U.S. PATENT DOCUMENTS

| | | | | |
|---|---|---|---|---|
| 5,398,334 A | * | 3/1995 | Topka et al. | |
| 5,560,005 A | * | 9/1996 | Hoover et al. | |
| 5,765,174 A | * | 6/1998 | Bishop | |
| 6,473,773 B1 | * | 10/2002 | Cheng et al. | ................... 707/814 |
| 6,604,167 B1 | * | 8/2003 | Blandy | ............... G06F 9/45516 711/100 |
| 6,754,796 B2 | * | 6/2004 | Sokolov | .................. G06F 9/445 711/170 |
| 7,089,272 B1 | * | 8/2006 | Garthwaite et al. | |
| 7,149,870 B2 | * | 12/2006 | Blandy | ......................... 711/173 |
| 7,376,684 B2 | * | 5/2008 | Blandy | |
| 7,882,159 B2 | * | 2/2011 | Beard | ........................... 707/814 |

(Continued)

OTHER PUBLICATIONS

Cohen, "Garbage Collection of Linked Data Structures," Computing Surveys, vol. 13, No. 3, Sep. 1981.*

(Continued)

*Primary Examiner* — Augustine K Obisesan
*Assistant Examiner* — Lin Lin Htay
(74) *Attorney, Agent, or Firm* — Cantor Colburn LLP; Vazken Alexanian

(57) ABSTRACT

One or more embodiments are directed to creating a structure comprising a weak reference to an object, a strong reference to the object, a count of remote references to the object, and an identifier for the object, incrementing the count when a remote reference is created to the object and decrementing the count when a remote reference is removed, setting the strong reference in response to the count being greater than a first threshold in order to avoid a garbage collection of the object, clearing the strong reference in response to the count being less than a second threshold to enable a garbage collection of the object, and removing the structure and related resources based on a recognition of the object's collection through the weak reference.

12 Claims, 5 Drawing Sheets

(56) References Cited

U.S. PATENT DOCUMENTS

| | | | |
|---|---|---|---|
| 8,504,596 B2* | 8/2013 | Garst, Jr. ........................ | 707/814 |
| 2002/0087589 A1* | 7/2002 | Wallman ........................ | 707/206 |
| 2004/0040018 A1* | 2/2004 | Fleming .............. | G06F 12/0269 |
| | | | 717/162 |
| 2007/0266037 A1* | 11/2007 | Terry et al. .................... | 707/100 |
| 2008/0270482 A1 | 10/2008 | Hillberg | |
| 2009/0157996 A1* | 6/2009 | Arimilli et al. ............... | 711/170 |
| 2009/0327372 A1* | 12/2009 | Ylonen ......................... | 707/206 |
| 2012/0066193 A1* | 3/2012 | King et al. .................... | 707/704 |
| 2012/0109895 A1* | 5/2012 | Zwilling et al. .............. | 707/648 |
| 2014/0040327 A1* | 2/2014 | Onodera et al. ............. | 707/814 |

OTHER PUBLICATIONS

Bevan, D. I.; "Distributed Garbage Collection Using Reference Counting"; In Proceedings of Parallel Languages on PARLE: Parallel Architectures and Languates Europe; 1987; pp. 176-187.

Kawachiya, Kiyokuni et al.; "Distributed Garbage Collection for Managed X10"; IBM Research—Tokyo; Jun. 14, 2012; 11 pages.

Package java.lang.ref.; http://docs.oracle.com/javase/6/docs/api/java/lang/ref/package-summary.html.

David Plainfosse and Marc Shapiro; "A Survey of Distributed Garbage Collection Techniques"; In Proceedings of the 1995 SIGPLAN International Workshop on Memory Management; Sep. 1995; pp. 211-249.

* cited by examiner

GARBAGE COLLECTION OF AN OBJECT

CROSS-REFERENCE TO RELATED APPLICATIONS AND PRIORITY CLAIM

This application is a continuation of U.S. Non-Provisional Application Ser. No. 13/563221, entitled "GARBAGE COLLECTION OF AN OBJECT", filed Jul. 31, 2012, which is incorporated herein by reference in its entirety.

BACKGROUND

The present disclosure relates generally to garbage collection in a computing environment, and more specifically, to garbage collection of an object that may be referenced remotely.

In distributed programming environments, a program can utilize multiple computers or computing devices, each of which may be referred to as a "place." An object may be created or initialized at a first place, and the first place may point to the object using a local reference. That same object may be referenced from one or more additional places, and such reference(s) may be referred to as remote reference(s).

In a computing environment, garbage collection may be used to reclaim resources (e.g., memory) occupied by one or more objects that are no longer in use by, e.g., a program. To garbage-collect a remotely-referenced object, it may be necessary to check that both local and remote references are deleted or eliminated. Such a check might not be easy when a first or upper-level language is implemented on a second or lower-level language by using the garbage collector of the second language. Conversely, if the garbage collector is implemented in the first or upper-level language, it may degrade the execution performance and interoperability with the second or lower-level language. An object that may be remotely-referenced may be registered in a table in order to preclude an inadvertent garbage-collection of the object.

BRIEF SUMMARY

According to one or more embodiments of the present disclosure, an apparatus for performing garbage collection comprises at least one processor, and memory having instructions stored thereon that, when executed by the at least one processor, cause the apparatus to create a structure comprising a weak reference to an object, a strong reference to the object, a count of remote references to the object, and an identifier for the object, increment the count when a remote reference is created to the object and decrement the count when a remote reference is removed, set the strong reference in response to the count being greater than a first threshold in order to avoid a garbage collection of the object, clear the strong reference in response to the count being less than a second threshold to enable a garbage collection of the object, and remove the structure and related resources based on a recognition of the object's collection through the weak reference.

According to one or more embodiments of the present disclosure, a non-transitory computer program product comprises a computer readable storage medium having computer readable program code stored thereon that, when executed by a computer, performs a method of garbage collection comprising registering a structure with at least one table to provide centralized control of an object by serving as a proxy for the object.

According to one or more embodiments of the present disclosure, a system for performing garbage collection comprises a computing device configured to store an object and a structure, the structure comprising a weak reference to the object, a strong reference to the object, a count of remote references to the object, and a unique identifier to the object, the computing device is configured to garbage collect the object when the count of remote references is less than a first threshold and when the number of local references to the object in the computing device is less than a second threshold.

According to one or more embodiments of the present disclosure, in a computer system having a plurality of programming language environments each managing its own memory region, the computer system conditionally performing garbage collection, wherein an object placed in a memory of a programming language environment is remotely referenced by another object placed in a memory of another programming language environment, a computer implemented method for managing references to the objects comprises creating a data structure comprising records having the fields of weak reference to an object placed in a memory of a programming language environment, strong reference to the object, the number of remote references to the object, and identifier of the object, for the object, incrementing the number of remote references to the object when a remote reference is created to the object and decrementing the number of remote references to the object when a remote reference to the object is removed, in response to the number of remote references to the object being equal to or more than one, placing the reference to the object in the field of strong reference to avoid a garbage collection of the object, in response to the number of remote references to the object being equal to zero, placing null to the object in the field of strong reference to enable a garbage collection of the object, and recognizing the garbage collection of the object based upon the weak reference to remove the corresponding record of the data structure.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
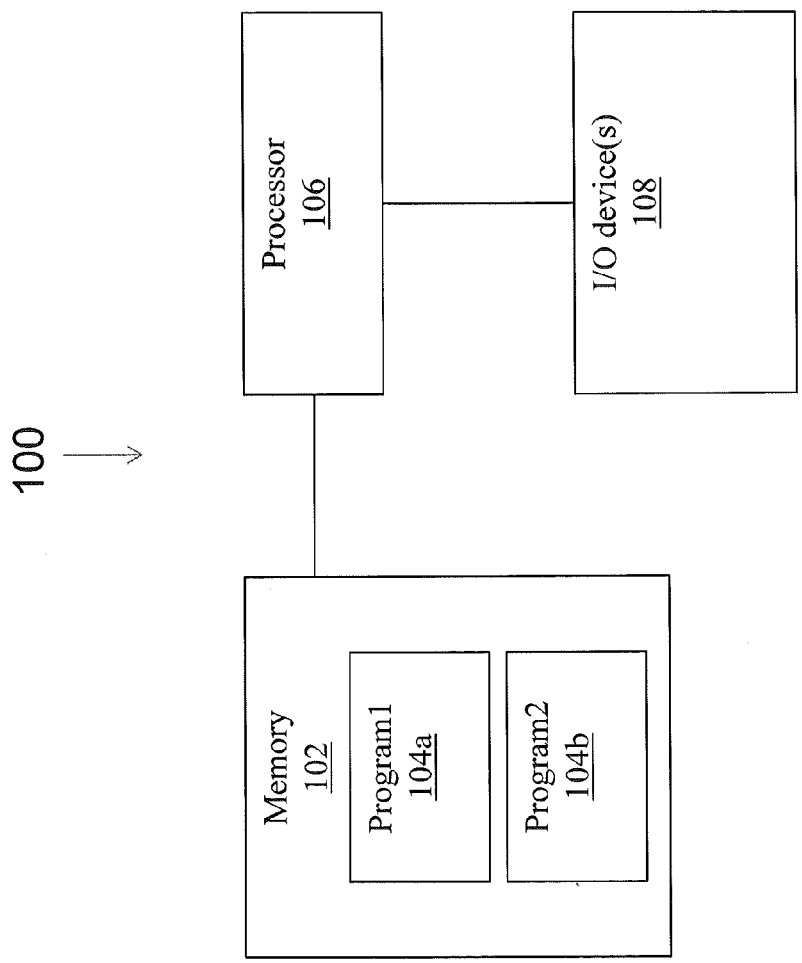
FIG. 1 is a schematic block diagram illustrating an exemplary system architecture in accordance with one or more aspects of this disclosure.

In accordance with various aspects of the disclosure, a low-cost mechanism may be provided to garbage-collect remotely-referenced objects in a distributed computing environment. In some embodiments, the garbage collection mechanism may be provided to, or utilized in connection with, a distributed programming language, such as the X10 project led by International Business Machines Corporation (IBM). The garbage collection mechanism may be provided to the distributed programming language running on a lower-level language, such as Java, without modifying the lower-level language.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities may refer to either a direct or an indirect connection.

Referring to FIG. 1, an exemplary system architecture 100 is shown. The architecture 100 is shown as including a memory 102. The memory 102 may store executable instructions. The executable instructions may be stored or organized in any manner and at any level of abstraction, such as in connection with one or more processes, routines, methods, etc. As an example, at least a portion of the instructions are shown in FIG. 1 as being associated with a first program 104a and a second program 104b. The first program 104a may be indicative of an upper-level programming language, such as X10. The second program 104b may be indicative of a lower-level programming language, such as Java. The instructions stored in the memory 102 may be executed by one or more processors, such as a processor 106.

The processor 106 may be coupled to one or more input/output (I/O) devices 108. In some embodiments, the I/O device(s) 108 may include one or more of a keyboard, a touchscreen, a display screen, a microphone, a speaker, a mouse, a button, a remote control, a joystick, a printer, etc. The I/O device(s) 108 may be configured to provide an interface to allow a user to interact with the architecture 100.

The architecture 100 is illustrative. In some embodiments, one or more of the entities may be optional. In some embodiments, additional entities not shown may be included. For example, in some embodiments the architecture 100 may be associated with one or more networks, which may be communicatively coupled to one another via one or more switches, routers, or the like. In some embodiments, the entities may be arranged or organized in a manner different from what is shown in FIG. 1.

Figure 2:
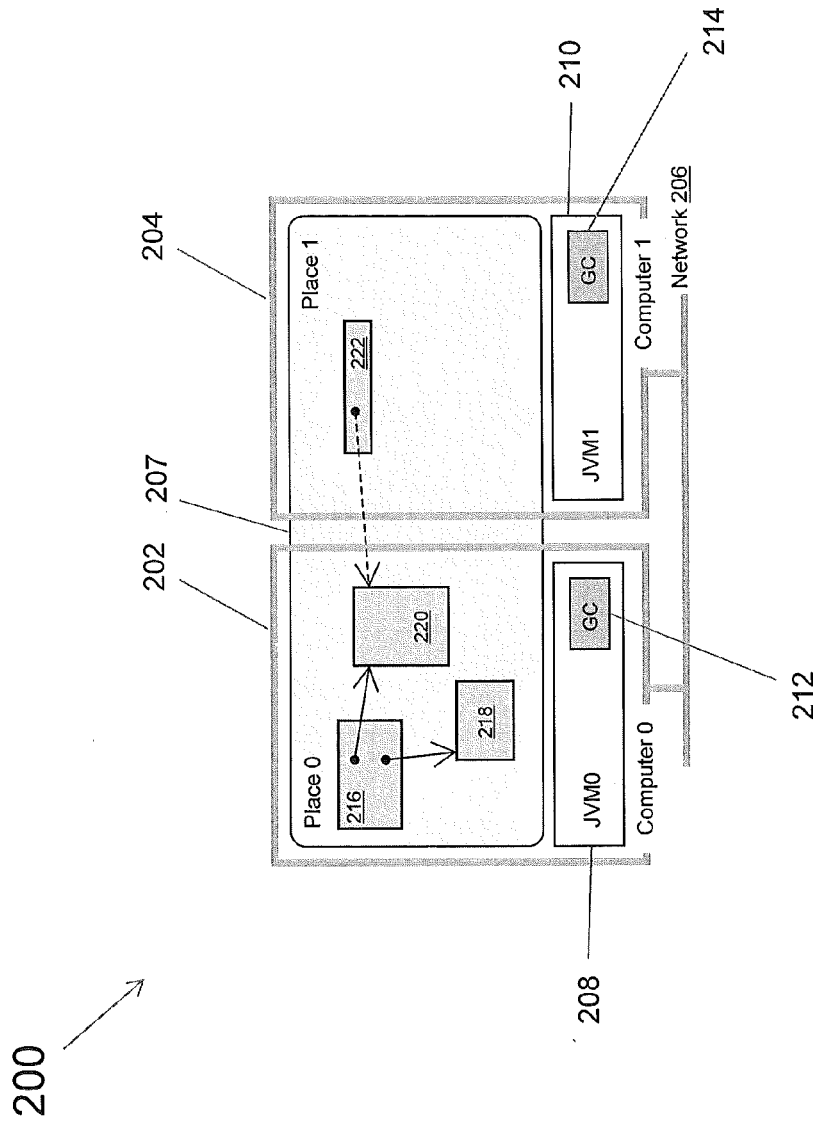
FIG. 2 is a schematic block diagram illustrating an exemplary local reference and an exemplary remote reference to an object in accordance with one or more aspects of this disclosure.

FIG. 2 illustrates a system environment 200 that may be used to illustrate a local reference and a remote reference with respect to an object. In some embodiments, the environment 200 may be operative in connection with one or more system architectures, such as the architecture 100 of FIG. 1.

In the environment 200, a first device or place 202 and a second device or place 204 may be communicatively coupled to one another via a network 206. The first place 202 and the second place 204 may be associated with an upper-level programming language 207, such as an X10 distributed environment.

The first place 202 may be associated with a (first) Java Virtual Machine (JVM) 208. The second place 204 may be associated with a (second) JVM 210. The JVM 208 contains a (first) garbage collection (GC) mechanism 212. The JVM 210 contains a (second) GC mechanism 214.

In some embodiments, the GC mechanisms 212 and 214 may perform a garbage collection of objects that are local to their respective places. Thus, the GC mechanism 212 may perform a garbage collection of objects local to the first place 202 and the GC mechanism 214 may perform a garbage collection of objects local to the second place 204.

As shown in FIG. 2, the first place 202 may contain a number of objects, such as objects 216, 218, and 220. The objects 216, 218, and 220 may be created or initialized at the first place 202. The object 216 may point to, or include references to, the objects 218 and 220. As the objects 218 and 220 are located in the same place as the object 216, the references to the objects 218 and 220 from the object 216 may be referred to as local references.

The second place 204 may contain a number of objects, such as an object 222. The object 222 may be created or initialized at the second place 204. The object 222 may point to, or include a reference to, the object 220. As the object 222 is located in a different place than the object 220, the reference to the object 220 from the object 222 may be referred to as a remote reference.

If the object 216 is removed, it may be possible to garbage collect the object 218 because no additional references to the object 218 are present in FIG. 2. If the object 216 is removed, it might not be possible to garbage collect the object 220 because the object 220 is remotely referenced by the object 222. In a lower-level language (e.g., Java), the reference pointing from the object 222 to the object 220 might not exist or be visible. Absent such a reference, the object 220 might inadvertently be collected by the GC mechanism 212. Embodiments of the disclosure, described in further detail below, prohibit the collection of the object 220 in the illustrative scenario described above (e.g., the removal of the object 216).

Figure 3:
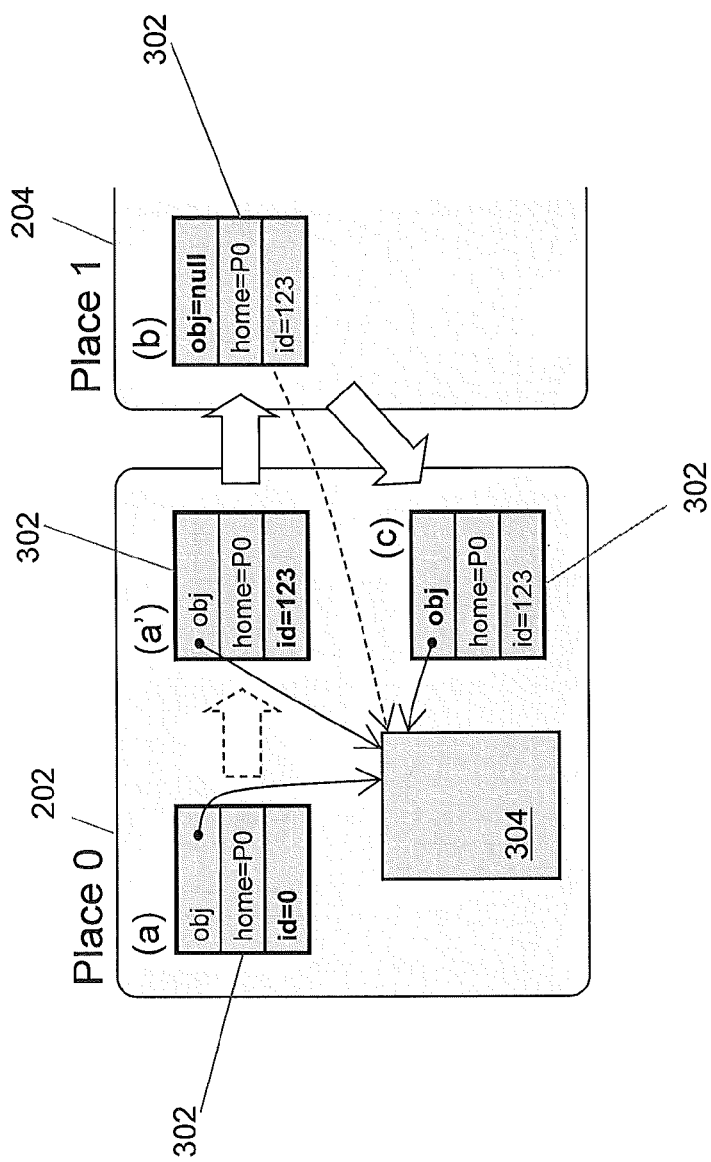
FIG. 3 is a state diagram illustrating an exemplary structure in accordance with one or more aspects of this disclosure.

FIG. 3 illustrates a state diagram associated with a structure 302. The structure 302 may be used in connection with a higher-level language, such as X10. The structure 302 may be used to express a global reference with respect to an object 304. The object 304 may correspond to one or more of the objects 216, 218, 220, and 222 of FIG. 2 in some embodiments.

The structure 302 may comprise one or more fields. For example, the structure 302 may include three fields. A first field, referred to as "obj" herein, may serve as a reference to the object 304 held by the structure 302. A second field, referred to as "home" herein, may serve to indicate the place where the structure 302 is created (hence where the object "obj" exists). A third field, referred to as "id" herein, may correspond to a unique identifier assigned to the object 304. In some embodiments, one or more of the states (a), (a'), (b), and (c) of FIG. 3 described below may correspond to instances of the structure 302.

As shown in state (a) of FIG. 3, upon creation or initialization of the structure 302, the "obj" field may be set to point to the object 304, the "home" field may be set equal to the first place (P0) 202 where the object 304 exists, and the "id" field may be set to zero. The value of zero for the "id" field may correspond to a default or initialization value.

The transition from state (a) to state (a') in FIG. 3 may be the result of a globalization of the object 304, by which the object becomes referable from other places. In response to the globalization of the object 304, a unique identifier may be assigned to the object 304. As shown in state (a') of FIG. 3, the unique identifier may correspond to a number such as "123." In some embodiments, other forms for the unique identifier may be used, such as an alphanumeric identifier, symbols, special characters, etc.

The transition from state (a') to state (b) in FIG. 3 may be the result of the structure 302 being passed (copied) from the first place 202 to another place, such as the second place 204. All of the fields of the structure 302 associated with state (a')

may be passed in connection with state (b), potentially less the "obj" field value. For example, as shown in state (b), the "obj" field in the structure 302 at the second place 204 may be set to "null."

When the structure 302 is returned to the home place (which is the first place 202 in this example) from the remote place (which is the second place 204 in this example), which may correspond to the transition from state (b) to state (c) in FIG. 3, the "id" field may be examined to identify the object 304 as being associated with id=123 . In this manner, the "obj" field may be restored from "null" to point to the object 304 in connection with the transition from state (b) to state (c).

To achieve the behavior described above in connection with FIG. 3 with respect to the structure 302, a number of conditions may need to be satisfied. For example, one or more of six conditions may need to be satisfied. These six conditions are described below.

As a first condition, when the object 304 is globalized, a unique identifier (e.g., "123") may be assigned to the object. Assigning a unique identifier may make it possible to search for the identifier from the object 304. Such a feature may be desirable in order to assign the same identifier to (instances of) structures 302 which point to the same object 304.

As a second condition, it may be possible to search for the object 304 based on the identifier. Such a feature may be desirable in order to point to the object 304 when the structure returns to the home place (e.g., corresponding to the transition from state (b) to state (c) in FIG. 3).

As a third condition, once an identifier is assigned to the object 304, the identifier might not change until the object 304 is deleted. Such a feature may be desirable in order to ensure consistency between instances of the structure 302 (e.g., instances of the structure 302 coinciding with states (a') and (c) in FIG. 3).

As a fourth condition, the object 304 might not be garbage collected when an instance of the structure 302 exists in a remote place (e.g., the second place 204, corresponding to state (b) in FIG.3). If such a condition is not enforced, an error may occur when the remote reference is used.

As a fifth condition, if an object (e.g., the object 304) is not referenced locally or remotely, the object may be garbage collected. The collection may be performed using a local JVM garbage collection mechanism (e.g., GC 212 of the first place 202). Garbage collection of non-referenced objects may help to preserve resources in some embodiments.

As a sixth condition, when an object (e.g., the object 304) is garbage collected, one or more related resources (e.g., the identifier and other data) may also be deleted. Such deletion may facilitate a preservation and/or re-use of resources.

Figure 4:
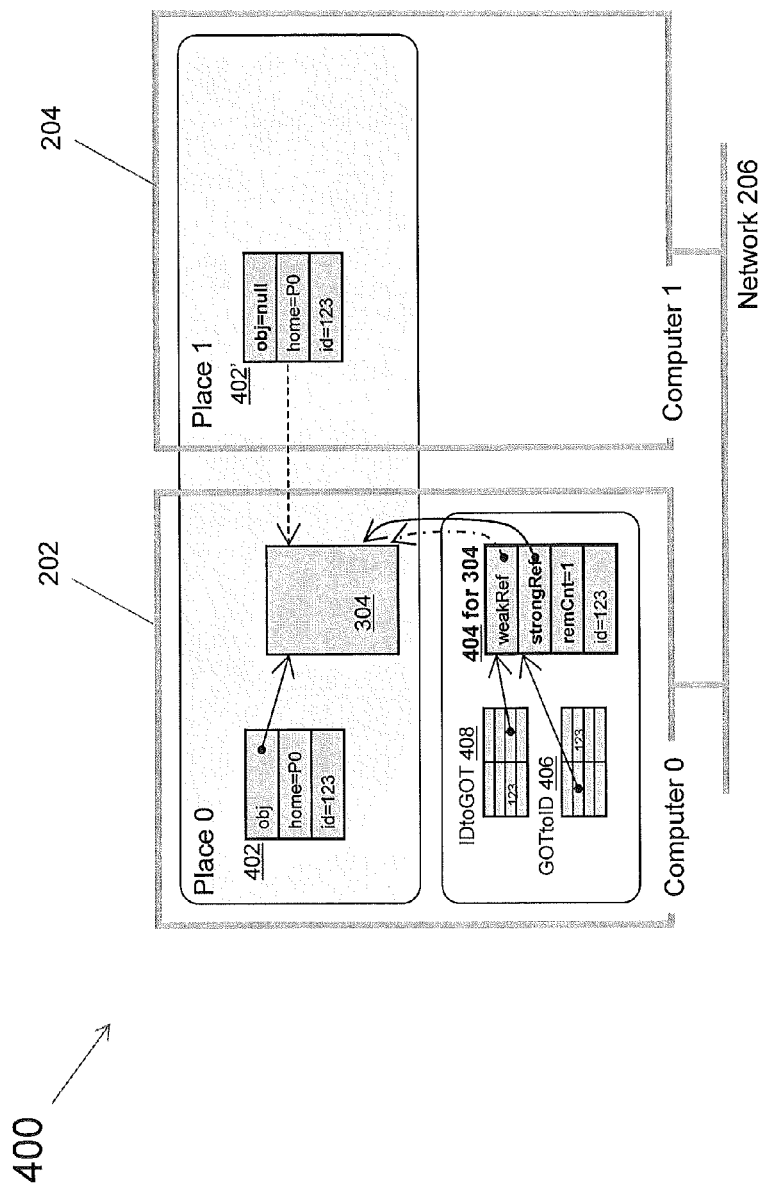
FIG. 4 is an environment illustrating an exemplary structure in accordance with one or more aspects of this disclosure.

FIG. 4 illustrates an environment 400 that may be used to satisfy one or more of the conditions described above. As shown in FIG. 4, a first instance 402 of the structure 302 may locally refer to the object 304 and a second instance 402' of the structure 302 may remotely refer to the object 304.

Also shown in FIG. 4 is a structure 404 for the object 304. The structure 404, which may be referred to as a globalized object tracker (GOT) structure, may centralize control of the globalized (e.g., remotely-referenced) object 304.

The structure 404 may include a number of fields that may be designated. For example, a first field, referred to as "weakRef" herein, may be set when the structure 404 is created and may provide a so-called "weak reference" to the object. The weak reference is a reference that does not prevent garbage collection and can detect the collection of the object. A second field, referred to as "strongRef" herein, may initially be cleared to "null" and may be set when the object 304 is referenced from at least one remote location (e.g., via the instance 402' at the second place 204). A third field, referred to as "remCnt" herein, may hold a count of the number of remote references to the object 304. Given the remote reference to the object 304 corresponding to the instance 402', remCnt is set equal to one in the example shown in FIG. 4. A fourth field, referred to as "id" herein, may hold a unique identifier for the object 304. As shown in FIG. 4, the "id" field for the structure 404 may be the same as the "id" fields for instances 402 and 402', which in this example is equal to "123."

In terms of the behavior or utilization of the structure 404, when the remCnt field is larger than zero, the strongRef field may be set or present to prohibit the collection of the object 304 by the local GC (e.g., GC 212). This may satisfy the fourth condition described above.

When the remCnt field becomes equal to zero, the strongRef field may be removed or cleared to null to enable garbage collection (e.g., local garbage collection) of the object 304 if no local reference is present. This may satisfy the fifth condition described above.

The structure 404 may be registered in two tables. A first of the tables 406, which may be referred to as "GOTtoID" herein, may enable a search of an identifier or "id" from the object 304, optionally on the basis of a temporary GOT whose weakRef points to the object 304. Such a search using the table 406 may satisfy the first condition described above. A second of the tables 408, which may be referred to as "IDtoGOT" herein, may enable a search of an object (e.g., the object 304) from the "id" or identifier. Such a search using the table 408 may satisfy the second condition described above. The searches may be facilitated via one or more links between the tables 406 and 408 and the structure 404.

When a globalized object (e.g., the object 304) is alive, the structure 404 may be registered in the tables 406 and 408. Such registration may ensure that a mapping between the object 304 the identifier/id is not changed, which may satisfy the third condition described above.

The garbage collection of a globalized object (e.g., the object 304) can be detected through the weak reference in the structure 404. When detected, the structure 404 may be removed from the tables 406 and 408 and collected, which may satisfy the sixth condition described above.

Figure 5:
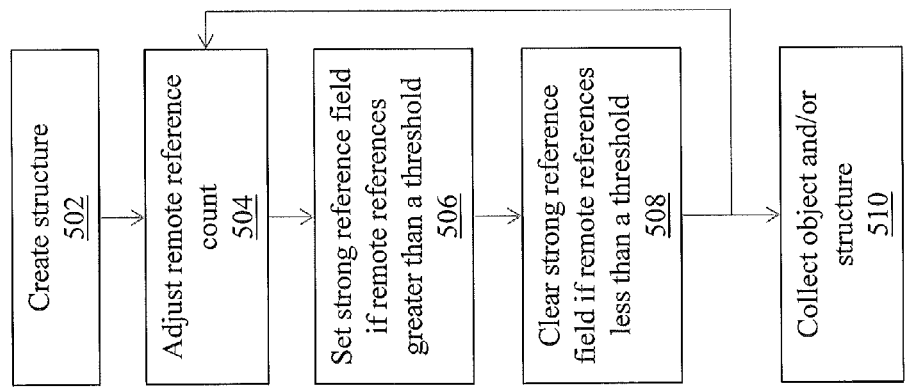
FIG. 5 is a flow diagram illustrating an exemplary method in accordance with one or more aspects of this disclosure.

FIG. 5 is a flow diagram illustrating a method that may be used to manage references to an object. The method of FIG. 5 may be implemented in connection with one or more architecture or environments, such as those described herein. In some embodiments, the method of FIG. 5 may be implemented in a computer system having a plurality of machines (e.g., virtual machines) each managing its own memory region. The computer system may conditionally perform garbage collection, wherein an object that is placed in a memory of a first machine may be remotely referenced by another object placed in a memory of a second machine.

In block 502, a structure (e.g., a reference data structure) may be created. The structure may include one or more records having one or more of a weak reference field potentially pointing to an object placed in a memory of a machine, a strong reference field potentially pointing to the object, a count of remote references to the object, and an identifier/id of the object.

In block 504, the number or count of remote references may be adjusted. For example, when a remote reference is made to the object the count of remote references may be incremented. When a remote reference to the object is removed, the count of remote referenced may be decremented.

In block 506, in response to the number of remote references to the object being equal to or more than one, or more generally greater than a threshold, a reference to the object may be placed or set in the strong reference field to avoid a garbage collection of the object.

In block 508, in response to the number of remote references to the object being equal to zero, or more generally less than a threshold, a reference to the object may be cleared from the strong reference field to potentially allow for a garbage collection of the object. In some embodiments, flow may proceed from block 508 to block 504. For example, blocks 504, 506, and 508 may execute repeatedly and/or as part of a continuous loop.

In block 510, the object may be collected based upon the detection of no references to the object. As part of block 510, the structure created in block 502 may be removed from one or more tables and may be collected. As part of block 510, a garbage collection of an object may be recognized based upon a weak reference to remove a corresponding record of the structure.

It will be appreciated that the events of the state diagram of FIG. 3 and the method of FIG. 5 are illustrative in nature. In some embodiments, one or more of the operations or events (or a portion thereof) may be optional. In some embodiments, one or more additional operations not shown may be included. In some embodiments, the operations may execute in an order or sequence different from what is shown in FIG. 3 and/or FIG. 5. In some embodiments, operations of FIG. 3 and FIG. 5 may be combined to obtain a variation on the state diagram and method depicted in FIG. 3 and FIG. 5, respectively.

As described herein, in some embodiments an object might not be directly registered with, e.g., a table. In some embodiments, a structure (e.g., a GOT structure) may serve as a proxy for the object, and the structure may be registered with one or more tables. The structure may provide centralized control of the object.

Embodiments of the disclosure may be implemented independent of a specific instruction set (e.g., CPU instruction set architecture), operating system, or programming language. For example, embodiments of the disclosure may provide a low-cost mechanism to garbage-collect remotely-referenced objects in a distributed programming environment without having to modify a lower-level language.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

As will be appreciated by one skilled in the art, aspects of this disclosure may be embodied as a system, method or computer program product. Accordingly, aspects of the present disclosure make take the form of an entirely hardware embodiment, an entirely software embodiment (including firmware, resident software, micro-code, etc.) or an embodiments combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized, such as one or more non-transitory computer readable mediums. The computer readable medium(s) may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming language, including an object oriented programming language such as Java, Smalltalk, C++ or the like and conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, an apparatus or system may comprise at least one processor, and memory storing instructions that, when executed by the at least one processor, cause the apparatus or system to perform one or more methodological acts as described herein. In some embodiments, the memory may store data, such as one or more data structures, metadata, etc.

Embodiments of the disclosure may be tied to particular machines. For example, in some embodiments one or more devices may manage or control the operation of one or more structures. Such management may include creating a structure, initializing or modifying fields of the structure, and garbage-collecting an object or the structure. In some embodiments, the one or more devices may include a computing device, such as a personal computer, a laptop computer, a mobile device (e.g., a smartphone), a server, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There may be many variations to the diagram or the steps (or operations) described therein without departing from the spirit of the disclosure. For instance, the steps may be performed in a differing order or steps may be added, deleted or modified. All of these variations are considered a part of the disclosure.

It will be understood that those skilled in the art, both now and in the future, may make various improvements and enhancements which fall within the scope of the claims which follow.

What is claimed is:

1. In a computer system having a plurality of computers each managing its own memory region and conditionally performing garbage collection, a first object placed in a memory of a first computer being remotely referenced by a second object placed in a memory of a second computer, the first computer for executing a first program and a second program, the first object belonging to the first program and not to the second program, a computer implemented method for managing references to the first object, the computer implemented method comprising:
   creating a first data structure for the first program, wherein the first program does not have a garbage collection mechanism, the first data structure comprising:
      a first field that stores a reference to the first object when the first data structure is local to the first object and is cleared to null when the first data structure is remotely located from the first object by being copied into the second computer,
      a second field that stores an identifier of the location of the first object, and
      a third field that stores an identifier of the first object when the first object is globalized, the identifier being unique within all of the plurality of computers;
   creating a second data structure for the second program, wherein the second program has a garbage collection mechanism, the second data structure comprising records having the fields of weak reference to the first object, strong reference to the first object, a number of remote references to the first object, and the identifier of the first object;
   incrementing the number of remote references to the first object when a remote reference is created to the first object and decrementing the number of remote references to the first object when a remote reference to the first object is removed;
   in response to the number of remote references to the first object being equal to or more than one, placing the reference to the first object in the field of strong reference to avoid a garbage collection of the first object by the garbage collection mechanism of the second program;
   in response to the number of remote references to the first object being equal to zero, replacing the reference to the first object with a null reference in the field of strong reference to enable garbage collection of the first object, wherein the weak reference continues to point to the first object when the null reference is placed in the field of the strong reference;
   recognizing the garbage collection of the first object based upon the weak reference;
   creating a first table for the second program that enables search of the identifier based on the first object;
   creating second table for the second program that enables search of the first object based on the identifier;
   registering the first data structure and the second data structure in the first table and in the second table; and
   deleting the second data structure from the first table and the second table, responsive to recognizing the garbage collection of the first object based upon the weak reference.

2. The method of claim 1, further comprising:
   garbage collecting the first object using the garbage collection mechanism of the second program.

3. The method of claim 2, wherein the second program is implemented in Java programming language to run in a Java virtual machine, and the garbage collection mechanism of the second program is the garbage collector in the Java virtual machine.

4. The method of claim 2, further comprising:
   garbage collecting the first object of the first program, which is implemented in a distributed programming language running on Java virtual machines, without modifying the Java virtual machines.

5. The method of claim 4, wherein the distributed programming language comprises X10 programming language environment.

6. The method of claim 1, wherein the plurality of computers comprise one or more virtual machines.

7. A non-transitory computer program product comprising a computer readable storage medium having computer readable program code stored thereon that, when executed by a first computer, performs a method of garbage collection, the first computer being one of a plurality of computers each managing its own memory region and conditionally performing garbage collection, a first object placed in a memory of the first computer being remotely referenced by a second object placed in a memory of a second computer, the first computer for executing a first program and a second program, the first object belonging to the first program and not to the second program, the method comprising:
   creating a first data structure for the first program, wherein the first program does not have a garbage collection mechanism, the first data structure comprising:
      a first field that stores a reference to the first object when the first data structure is local to the first object and is cleared to null when the first data structure is remotely located from the first object by being copied into the second computer,
      a second field that stores an identifier of the location of the first object, and
      a third field that stores an identifier of the first object when the first object is globalized, the identifier being unique within all of the plurality of computers;
   creating a second data structure for the second program, wherein the second program has a garbage collection mechanism, the second data structure comprising records having the fields of weak reference to the first object, strong reference to the first object, a number of remote references to the first object, and the identifier of the first object;

incrementing the number of remote references to the first object when a remote reference is created to the first object and decrementing the number of remote references to the first object when a remote reference to the first object is removed;

in response to the number of remote references to the first object being equal to or more than one, placing the reference to the first object in the field of strong reference to avoid a garbage collection of the first object by the garbage collection mechanism of the second program;

in response to the number of remote references to the first object being equal to zero, replacing the reference to the first object with a null reference in the field of strong reference to enable garbage collection of the first object, wherein the weak reference continues to point to the first object when the null reference is placed in the field of the strong reference;

recognizing the garbage collection of the first object based upon the weak reference;

creating a first table for the second program that enables search of the identifier based on the first object;

creating second table for the second program that enables search of the first object based on the identifier;

registering the first data structure and the second data structure in the first table and the second table; and deleting the second data structure from the first table and the second table, responsive to recognizing the garbage collection of the first object based upon the weak reference.

8. The computer program product of claim 7, wherein the method further comprises:

garbage collecting the first object using the garbage collection mechanism of the second program.

9. The computer program product of claim 8, wherein the second program is implemented in Java programming language to run in a Java virtual machine, and the garbage collection mechanism of the second program is the garbage collector in the Java virtual machine.

10. The computer program product of claim 8, wherein the method further comprises:

garbage collecting the first object of the first program, which is implemented in a distributed programming language running on Java virtual machines, without modifying the Java virtual machines.

11. The computer program product of claim 7, wherein the plurality of computers comprise one or more virtual machines.

12. The computer program product of claim 7, wherein the plurality of computers comprise one or more virtual machines.

* * * * *